United States Patent
Yokota et al.

(10) Patent No.: US 6,810,328 B2
(45) Date of Patent: Oct. 26, 2004

(54) NAVIGATION METHOD AND SYSTEM FOR INDICATING AREA-SPECIFIC TRAFFIC INFORMATION

(75) Inventors: Tatsuo Yokota, Torrance, CA (US); Michael Sabin, Redondo Beach, CA (US)

(73) Assignee: Alpine Electronics, Inc, Tokyo (JP)

( * ) Notice: Subject to any disclaimer, the term of this patent is extended or adjusted under 35 U.S.C. 154(b) by 162 days.

(21) Appl. No.: 10/302,301

(22) Filed: Nov. 23, 2002

(65) Prior Publication Data

US 2004/0102898 A1 May 27, 2004

(51) Int. Cl.[7] .............................................. G01C 21/34
(52) U.S. Cl. .................. 701/210; 701/209; 340/995.13; 340/995.21
(58) Field of Search ................................. 701/208, 209, 701/210; 340/995.13, 995.19, 995.21

(56) References Cited

U.S. PATENT DOCUMENTS

| | | | |
|---|---|---|---|
| 5,699,056 A | | 12/1997 | Yoshida |
| 6,205,400 B1 | | 3/2001 | Lin |
| 6,292,743 B1 | * | 9/2001 | Pu et al. ...................... 701/202 |
| 6,484,089 B1 | | 11/2002 | Millington |
| 6,542,812 B1 | * | 4/2003 | Obradovich et al. ......... 701/207 |
| 6,707,421 B1 | * | 3/2004 | Drury et al. ............. 342/357.1 |
| 2003/0187573 A1 | * | 10/2003 | Agnew et al. .............. 701/201 |
| 2004/0073361 A1 | * | 4/2004 | Tzamaloukas et al. ...... 701/210 |
| 2004/0104842 A1 | * | 6/2004 | Drury et al. ........... 342/357.13 |

* cited by examiner

Primary Examiner—Gary Chin
(74) Attorney, Agent, or Firm—Muramatsu & Associates

(57) ABSTRACT

A navigation method and system for guiding a user to a destination while providing area-specific information useful for guiding and warning the user such as local traffic laws, driving conditions, traffic customs, weather conditions, etc. that is specifically tailored for each user. The area-specific information is customized for a user in order to give the area-specific information to the user that is most relevant to that particular user. The navigation system informs the user of the area-specific information that is different from that of the user's home area or the information specific to the calculated route to the destination or unique to the current location of the user. Further, the navigation system customizes the calculated route such that driving conditions and situations that are unfamiliar to the user will be minimized.

22 Claims, 12 Drawing Sheets

Fig. 4

| Comprehensive Traffic Laws & Driving Conditions Database (for U.S.) | | | | | | | | | | | | | |
|---|---|---|---|---|---|---|---|---|---|---|---|---|---|
| U.S. | AK | AL | AR | AZ | CA | CO | CT | DE | ⋮ | WV | WY |
| 02 | 02 | 02 | 02 | 02 | 02 | 02 | 02 | 02 | ⋮ | 02 | 02 |
| 01 | 01 | 01 | 01 | 01 | 01 | 01 | 01 | 01 | ⋮ | 01 | 01 |
| 00 | 00 | 00 | 00 | 00 | 00 | 00 | 00 | 00 | ⋮ | 00 | 00 |
| 99 | 99 | 99 | 99 | 99 | 99 | 99 | 99 | 99 | ⋮ | 99 | 99 |
| 98 | 98 | 98 | 98 | 98 | 98 | 98 | 98 | 98 | ⋮ | 98 | 98 |
| 97 | 97 | 97 | 97 | 97 | 97 | 97 | 97 | 97 | ⋮ | 97 | 97 |
| ⋯ | ⋯ | ⋯ | ⋯ | ⋯ | ⋯ | ⋯ | ⋯ | ⋯ | ⋮ | ⋯ | ⋯ |
| 80's | 80's | 80's | 80's | 80's | 80's | 80's | 80's | 80's | ⋮ | 80's | 80's |
| 70's | 70's | 70's | 70's | 70's | 70's | 70's | 70's | 70's | ⋮ | 70's | 70's |
| old | old | old | old | old | old | old | old | old | ⋮ | old | old |

Fig. 6A

| Select State |
|---|
| Alabama |
| Alaska |
| Arizona |
| Arkansas |
| California |

Fig. 6B

| Arizona |
|---|
| Normal Speed Limit: 55 MPH |
| Freeway Speed Limit: 65 MPH |
| School Zone Speed Limit: 25 MPH |
| Right Turn on Red Allowed |
| Frequent One Lane Bridge |

Fig. 6C

| Phoenix |
|---|
| Normal Speed Limit: 55 MPH |
| Freeway Speed Limit: 65 MPH |
| School Zone Speed Limit: 25 MPH |
| Right Turn on Red Allowed |
| No Parking 7AM to 6PM |

Fig. 8A

Set-Up Menu

Your home state is: California ▼

Your age is: 34 ▼

States you are familiar with are:

New York, Nevada | ADD

Fig. 8B

Compare Information

Compare: California ▼

With: Arizona ▼

☒ Traffic Laws

☐ Customs

☒ Driving Conditions / Weather

Fig. 8C

Compare Information

Compare: Home City ▼

With: Arizona ▼

☒ Traffic Laws

☐ Customs

☒ Driving Conditions / Weather

NAVIGATION METHOD AND SYSTEM FOR INDICATING AREA-SPECIFIC TRAFFIC INFORMATION

FIELD OF THE INVENTION

This invention relates to a navigation method and system for guiding a user to a destination, and more particularly, to a navigation method and system for providing area-specific traffic information useful for guiding and warning the user such as local traffic laws, driving conditions, traffic customs, weather conditions, etc. which is specifically tailored for each user.

BACKGROUND OF THE INVENTION

A navigation system performs travel guidance for enabling a user to easily reach the selected destination. A typical example is a vehicle navigation system. Such a navigation system detects the position of the vehicle, reads out map data pertaining to an area at the current vehicle position from a data storage medium, for example, a CD-ROM (compact disc read-only memory), a DVD (digital versatile disc) or a hard disc, and displays a map image on a monitor screen (display) while superimposing a mark representing the current location of the vehicle on the map image. Alternatively, such map data can be provided to the vehicle from a remote server through a communication network such as Internet.

As the present position of the vehicle changes with the travel of the vehicle, the vehicle current position mark in the map image on the screen is changed accordingly. Alternatively, the map is scrolled while the vehicle current position mark is fixed at a predetermined position, for example, at the center of the image. In either method, the navigation system enables the user to recognize the map information of the area at the vehicle position at a glance.

When a destination is not set, such a navigation system functions as a locator map which indicates the current location of the vehicle on a map image. When the destination is set, the navigation system starts a route guidance function for setting a guided route from the starting point to the destination. Typically, the route guidance function performs an intersection guidance process in which a monitor screen displays an enlarged intersection diagram and the direction in which the vehicle is to travel while displaying the guide route on a map. When a destination is input, a CPU in the navigation system determines a most suitable guided route from the current vehicle position to the destination and successively stores nodes (expressed in longitude and latitude) constituting the guided route in a memory.

During actual traveling, the node series stored in the memory is searched for a portion of the guided route to be displayed in a map display area of the monitor screen, and the portion of the guided route is highlighted so as to be discriminable from other routes. When the vehicle is within a predetermined distance of an intersection it is approaching, an intersection guidance diagram (an enlarged or highlighted intersection diagram with an arrow indicating the direction in which the vehicle is to turn at the intersection) is displayed to inform a user of the desired one of roads or directions selectable at the intersection.

FIG. 1A shows an example of a locator map display containing a current vehicle position mark VP on a map image 21. Typically, a navigation system shows the street on which the vehicle is running in the map image 21 and a name of the street such as "W 190TH ST" in an information box 23 on the monitor screen. Other information such as a north pointer NP, a map scale and a current time may also be illustrated on the display screen. In this manner, the locator map display shows the current position of the vehicle on the map image, however, it does not perform the route guidance function because the destination is not set in the navigation system.

FIG. 1B shows an example of route guidance display which performs the route guidance function. The route guidance display is activated after specifying the destination. In this example, the current street "W 190TH ST" and the left side of the next street "PRAIRIE AVE" will be highlighted in the map image 21 to show the direction of turn at the next intersection. The guidance information box 22 also shows the name of the street "PRAIRIE AVE" which intersects with the current street "W 190TH ST" and a distance to the intersection. Thus, the navigation system indicates that the vehicle should make a left turn at the intersection with "PRAIRIE AVE".

In this manner, a vehicle navigation system guides the user to the destination and a user enjoys efficient and comfortable vehicle travel. However, vehicle travel may pose a problem for a user due to differences in local traffic laws, driving conditions, local customs, weather/climate, etc. For example, when a user drives a vehicle from Los Angels to Phoenix, the user must cross a state border between California and Arizona. Since each state is an independent jurisdiction, the traffic laws differ between those states.

Moreover, there are differences in driving conditions, driving customs, and weather/climate conditions. A similar situation also arises when a user crosses a border between two countries in Europe, such as France and Germany. In such a case, the differences in the traffic laws, driving conditions, local driving customs, and climate conditions may be more pronounced. Such differences may exist even within the same state when a user enters into a county or a city. For instance, there may be a peculiar city ordinance on headlight requirements.

FIG. 2 is an illustration showing an instance when the area-specific information is pertinent for safe and enjoyable driving. As shown in FIG. 2, a vehicle having a vehicle navigation system is crossing a border of two states (ex. from California to Arizona) that have different traffic laws. The traffic laws between those states may differ significantly although the user may not be aware of the differences. Moreover, there may be differences in weather conditions or driving customs that may affect the driving performance of the user.

There are many factors that affect the driving performances. In some places, the speed limits for freeways differ between day and night. The speed is measured by miles per hour in some places and kilometers per hour in others. For instance, when a user moves from the United States to Canada, the speed measurement differs due to the difference in the speed unit, which confuses the user. The rules on street parking may differ in that some places allow parking opposite direction whereas others do not. There may be rules on how much distance from the corner must be maintained for street parking. Turning restrictions differ by places such as the right turn on red signal.

Further, there are traffic signs specific to an area that require familiarity on the part of a user. Peculiar traffic light requirements in a particular region may also pose a problem. In some highways, a "headlight zone" requires headlights on at all times. There are places where strict requirement of snow chains is applicable based on season, weather condition, mountain area, etc. Peculiar traffic geometry requires user's attention as well. For instance, in order to make a left turn, so called Michigan turn requires the user to first make a right turn and then make a U-turn to head for the destination. Occupant safety requirements, such as regulations regarding passengers in pickup-truck bed or child restraint, also differ from region to region.

Other factors includes, but not limited to, traffic condition or timing, such as merging or yellow light, and user behavior, such as general courtesy level, eye contact, adherence to traffic laws. In this manner, there are many differences in traffic laws, ordinances and customs. Thus, when the user travels through a difference country, state, or city, there may be several factors that affect user's performance.

Accordingly, when a user crosses one or more borders, the user has to be familiar with the traffic laws in all of the areas. However, people usually do not learn or memorize traffic laws for each region every time they travel to a different locale. Thus, in most cases, a user is familiar with the traffic laws of his/her own residence or home state only. Even when a user had lived in a different area and knew the traffic laws unique in that area, the traffic laws may have changed since that time.

Similar situation arises when a user flies across the borders and rents a car. For example, a California resident may fly to New York and rent a car at the airport, he may not be familiar with the New York traffic laws want to know the major differences from the California traffic law. In sum, trans-border travel poses difficulties for user to follow local traffic laws and customs. Such confusion may lead to stress, loss of enjoyment of driving, or even traffic violation and fines or accidents.

SUMMARY OF THE INVENTION

It is, therefore, an object of the present invention to provide a navigation method and system which is capable of showing the area-specific information in an efficient manner to guide the user for safe and enjoyable driving.

It is another object of the present invention to provide a navigation method and system which is capable of informing a user-about differences in traffic laws, driving conditions, local driving customs, weather conditions, etc. from what is familiar with the user.

It is a further object of the present invention to provide a navigation method and system which is capable of informing the user about traffic laws, driving conditions, customs, etc. unique to the calculated route to the destination.

It is a further object of the present invention to provide a navigation method and system which is capable of informing the user about traffic laws, driving conditions, customs, etc. unique to the current user position.

One aspect of the present invention is a navigation method for providing the area-specific information to the user based on the user's particular situation. The navigation method is comprised of the steps of: forming a comprehensive database storing traffic information in a navigation system for extraction of the traffic information with respect to each area, entering instructions in the navigation system to find traffic information specific to an area or destination specified by the user, searching and collecting traffic information from the database specific to the area or destination specified by the user, and informing the user of the collected traffic information specific to the area by the navigation system.

In the present invention, the traffic information in the database includes traffic laws and regulations, traffic conditions, traffic customs and typical weather conditions for each area and is coded and indexed in such a manner as to allow item-by-item extraction of the traffic information.

In the process of entering the instructions in the navigation system, a user specifies two areas so that the navigation system extracts and compares the traffic information between the two areas thereby producing information showing differences therebetween. Typically, one of the two areas is a home area of the user and another is an area unfamiliar to the user, and the traffic information between the two areas are compared to produce traffic information of only the another area which is different from that of the home area.

In the process of entering the instructions in the navigation system, the user specifies destination of travel in the navigation system so that the navigation system calculates and determines a calculated route to guide the user to the destination, and the navigation system searches and collects the traffic information unique to the calculated route. The navigation system produces a list of traffic information unique to the calculated route as soon as the calculated route is determined.

In the process of searching and collecting the traffic information, the navigation system detects a current location of the user and collects the traffic information unique to the current location. Further, in the process of searching and collecting the traffic information, the navigation system collects the traffic information unique to an attribute of the user where the attribute includes age and home city of the user.

The navigation method of the present invention further includes a step of arranging the collected traffic information in a manner easily comprehensible to the user by incorporating highlight, colors, different font sizes and types, background patterns, or icons. The navigation system lists the traffic information by placing a high priority to important differences from that of the user's home city and recent changes in traffic laws.

Another aspect of the present invention is a navigation system which is configured by various means for achieving the navigation methods described above. The navigation system guides the user to the destination as well as showing the user the traffic information specific to the particular area, calculated route or the current user location.

According to the present invention, the navigation method and system informs the user of area-specific information such as local traffic laws, driving conditions, local customs, weather/climate, etc. in an efficient manner by extracting relevant information tailored for the user and comparing information based on the assumed knowledge level. When the destination is specified and the calculated route to the destination is determined, the navigation method and system informs the user about traffic laws, driving conditions, customs, etc. unique to the calculated route. Further, while driving, the navigation method and system informs the user about traffic laws, driving conditions, customs, etc. unique to the current user position.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

FIG. 4 is a schematic representation of a database storing information regarding comprehensive traffic laws and driving conditions of various jurisdictions versus years in accordance with the present invention.

FIGS. 6A–6C are schematic diagrams showing display examples of extracting and browsing information from the database layer or reference book layer of FIG. 5 according to the present invention.

FIG. 8A is an example showing a set-up menu display used for a user to input basic information regarding the user's information and knowledge. FIGS. 8B–8C are diagrams showing an example of display of the navigation system when the user inputs two regions to be compared for extracting area-specific information in the handbook layer of FIG. 5.

DETAILED DESCRIPTION OF THE INVENTION

Figure 1A:
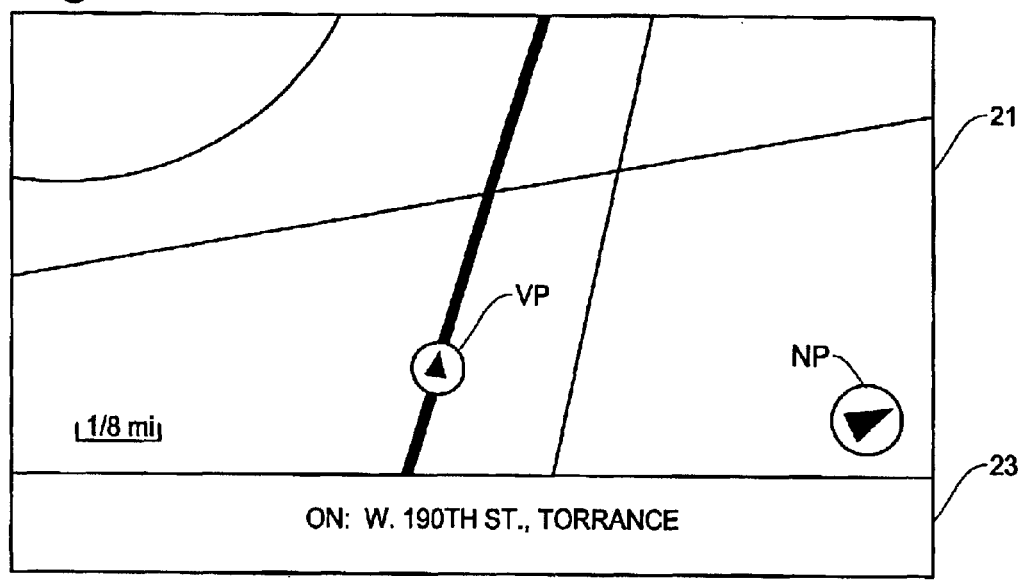
FIGS. 1A and 1B are schematic diagrams showing an example of locator map display and route guidance display, respectively, of a vehicle navigation system.
Figure 1B:
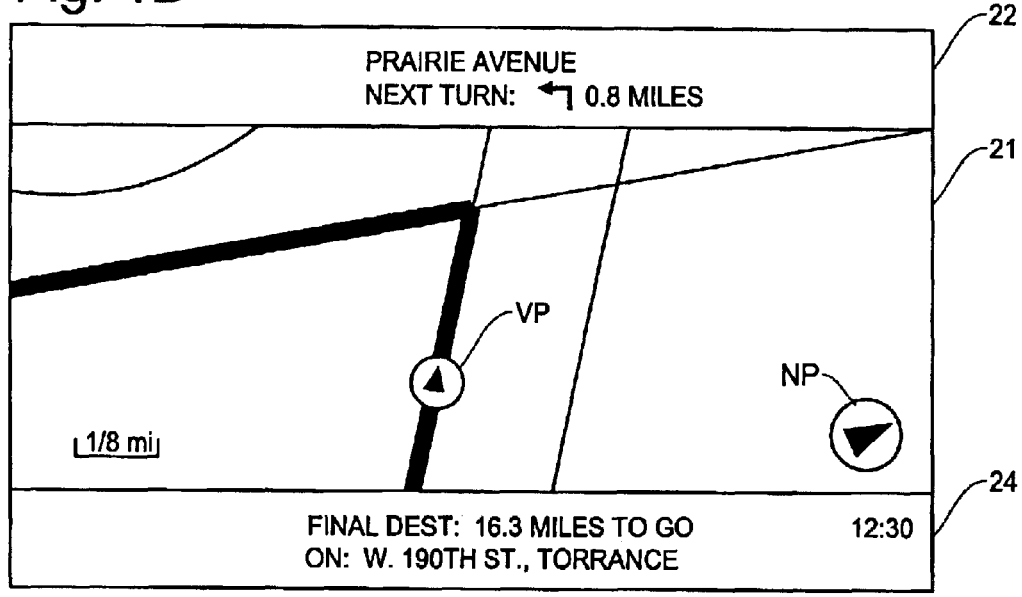
Figure 2:
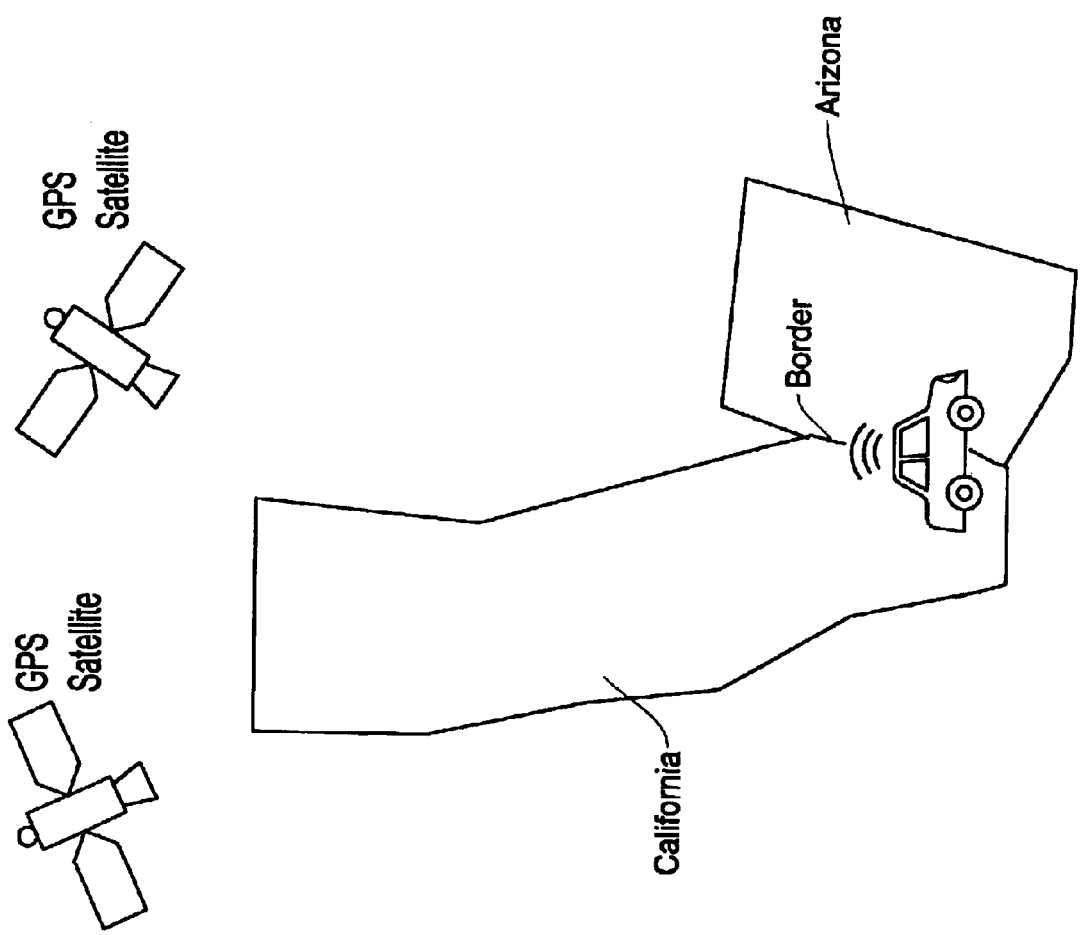
FIG. 2 is a schematic diagram showing an example of situation where area-specific information becomes necessary due to differences in traffic laws between two jurisdictions when a vehicle crosses a border.
Figure 3:
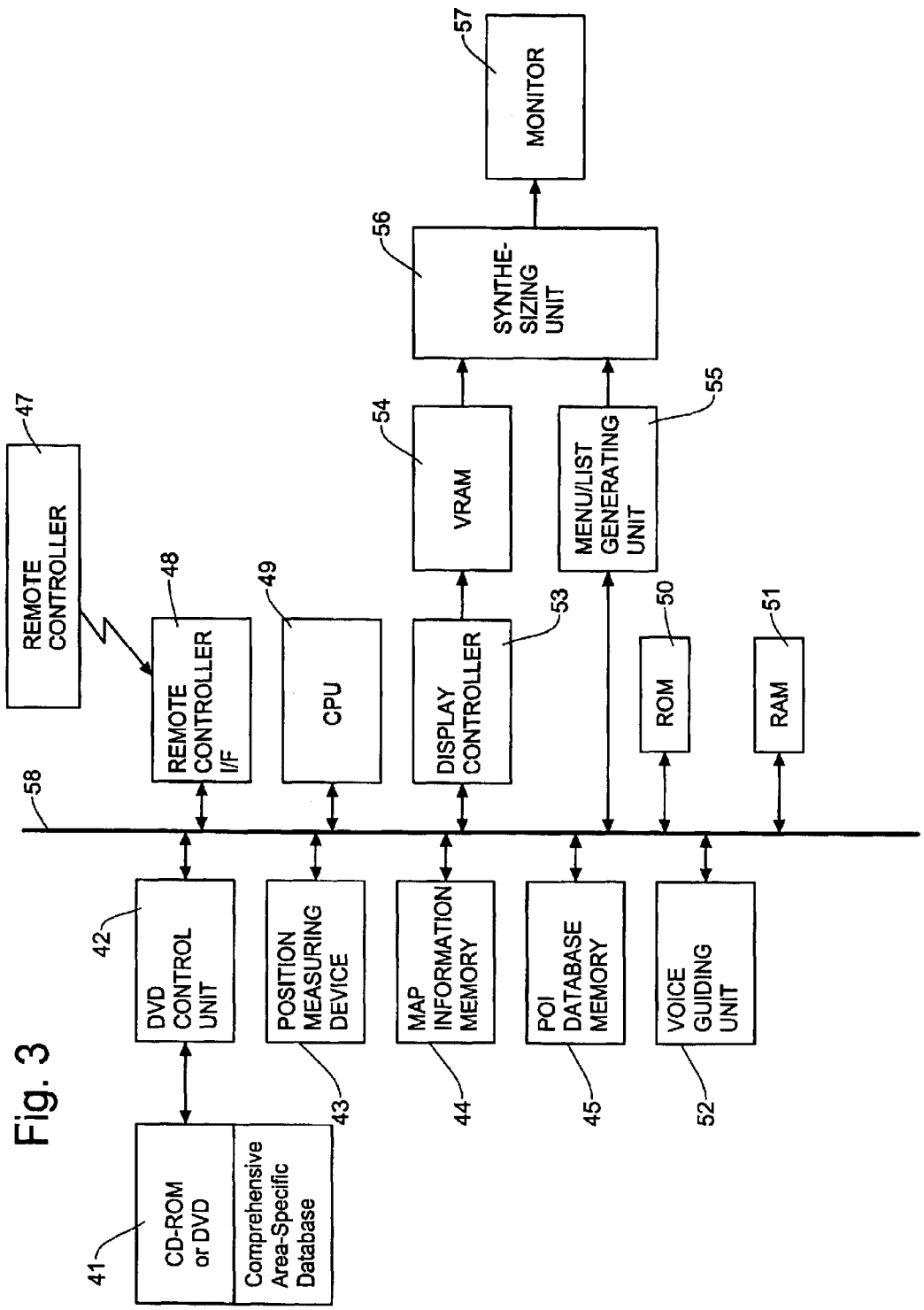
FIG. 3 is a block diagram showing an example of structure in the vehicle navigation system of the present invention.

The present invention will now be described in more detail with reference to accompanying drawings. The vehicle navigation system of the present invention has a database that stores information on comprehensive traffic laws and driving conditions, and other traffic information. Based on the database, the navigation system produces different layers of information depending on the user's need and the driving situation. FIG. 3 is a block diagram showing an example of structure of the navigation system of the present invention. FIGS. 4–12 show the processes for extracting the area-specific traffic information and display examples in the present invention.

In the block diagram of FIG. 3, the navigation system includes a map storage medium 41 such as a CD-ROM, DVD, hard disc or other storage means (hereafter "DVD") for storing map information. In the present invention, the DVD 41 preferably includes a comprehensive area-specific traffic information database. However, the database for storing the area-specific traffic information in the invention can be established by other storage means.

The block diagram includes a DVD control unit 42 for controlling an operation for reading the map information and area-specific traffic information from the DVD, a position measuring device 43 for measuring the present vehicle position. The position measuring device 43 has a vehicle speed sensor for detecting a moving distance, a gyroscope for detecting a moving direction, a microprocessor for calculating a position, a GPS receiver, etc.

The block diagram of FIG. 3 further includes a map information memory 44 for storing the map information which is read out from the DVD 41, a database memory 45 for storing database information such as the area-specific traffic information (ex. local traffic law) and point of interest (POI) information, etc. read out from the DVD 41, a remote controller 47 for executing a menu selection operation, an enlarge/reduce operation, a destination input operation, etc. and a remote controller interface 48.

Although not shown here, the navigation system has a remote controller for selecting menus, executing selected functions, etc. The navigation system usually includes various other input methods to achieve the same and similar operations done through the remote controller. For example, a navigation system may include hard keys and a joystick on a head unit of the navigation system mounted on a dash board, touch screen of the display panel, and voice communication means.

In the block diagram of FIG. 3, the navigation system further includes a bus 58 for interfacing the above units in the system, a processor (CPU) 49 for controlling an overall operation of the navigation system, a ROM 50 for storing various control programs such as a route search program and a map matching program necessary for navigation control, a RAM 51 for storing a processing result such as a guide route, a voice interface and guiding unit 52 for voice communication interface and spoken instructions, a display controller 53 for generating map images (a map guide image and an arrow guide image) on the basis of the map information, a VRAM 54 for storing the images generated by the display controller, a menu/list generating unit 55 for generating menu image/various list images, a synthesizing unit 56 for synthesizing images from the VRAM 54 and the menu/list generating unit 55, and a monitor (display) 57.

FIG. 4 shows an example of database provided to the vehicle navigation system of the present invention. The database is used to inform the user about area-specific traffic information such as local traffic laws. The table format in FIG. 4 is one example for a schematic representation only. The actual database can be any form for storing and extracting comprehensive information on traffic laws, traffic related customs, statistics, weather conditions, geographical features, and the like.

There are numerous unique rules and customs in each region. Thus, it is almost impossible for an ordinary user to be fully informed of all the rules for all regions. Moreover, it is impractical to inform the user about all the area-specific traffic information. In most cases, a user only needs to be informed of area-specific traffic information that is different from the rules and customs of the user's home city, with which the user is presumed to be familiar.

As will be described in detail, the vehicle navigation system of the present invention extracts relevant area-specific traffic information from the database. In one example of operation, such area-specific traffic information is extracted by comparing the information that the user is assumed to be familiar with and the information that the user is not assumed to be familiar with. Thus, the database must have entries that can be compared for each local area to extract relevant area-specific traffic information.

In order to facilitate the requirement described above, the database of the present invention stores information in such a way as to allow comparison of area-specific data according to several categories. As noted above, in the example of FIG. 4, the database is organized in the table format showing regions (ex. states) and time. Namely, this database is configured to extract the information such as traffic laws of a particular state of a particular year so as to compare the traffic laws between two or more states. In the time column, the recent chronological time is represented by the last two digits of the year, and older chronological time is represented by the decades or simply named "old."

When a vehicle crosses the border between two states such as California (CA) and Arizona (AZ), the navigation system detects the differences in the area-specific traffic information between California and Arizona. Alternatively, when a user flies across the border and rents a car at the airport in Arizona. Thus, the following descriptions of the present invention apply to the situation where the user's vehicle crosses the border to other states or the user rents the car in the other states. Assuming that the user is a California resident and is familiar with the California rules and customs, then only area-specific traffic information of Arizona that differs from that of California needs to be retrieved as will be explained later in detail. The database of FIG. 4 is conveniently configured to serve such a purpose.

In the case where a user had previously lived in a particular region, then the user may be familiar with traffic rules that was in effect when the user was residing in that region. However, the user may not be familiar with the changes of traffic laws after the user had left that region. In such a case, the comparison of traffic rules and regulations between the years allows the extraction of the differences that the user needs to know.

For example, when a user had lived in Arizona until 1998, the user is presumed to be familiar with traffic laws of Arizona up until that time. When the user visits Arizona, she only needs to know the changes of traffic laws that came into effect after 1998. Thus, the traffic laws until 1998 and after 1998 are compared, and the differences are extracted as relevant local specific traffic information. The utility of the chronological time category is not limited only to providing area-specific traffic information but may be used for other purposes such as to remind the user for renewal of driver's license.

The parameters in the table of database in FIG. 4 are shown for an illustration purpose only. The actual database can be further divided into smaller categories such as counties and cities within a state for specifying any internal differences, such as local regulations, landscape variations, climate differences, etc. Moreover, additional categories, such as degrees of importance and detail levels in the traffic laws, may be included. The data of the degrees of importance may include such categories as requirements, recommendations, helpful tips, etc., which may be based on the scope and applicability of the law or other issues and severity of consequences if not followed.

In the preferred embodiment, the database consists of text-based information, but graphic images such as traffic signs may also be included. Each item is preferably indexed or coded to determine applicability and relevancy of each item in a particular situation. For instance, a user age index may be used for age-related restriction, and a time-of-the-year index may be used for weather related advice. If desired, the database may also include related educational statistics, such as accident rates, weather records, general demography data, etc. For each region and for each year, traffic laws, street conditions, traffic controls, traffic conditions, climate/weather, and other local information may be provided.

Figure 5:
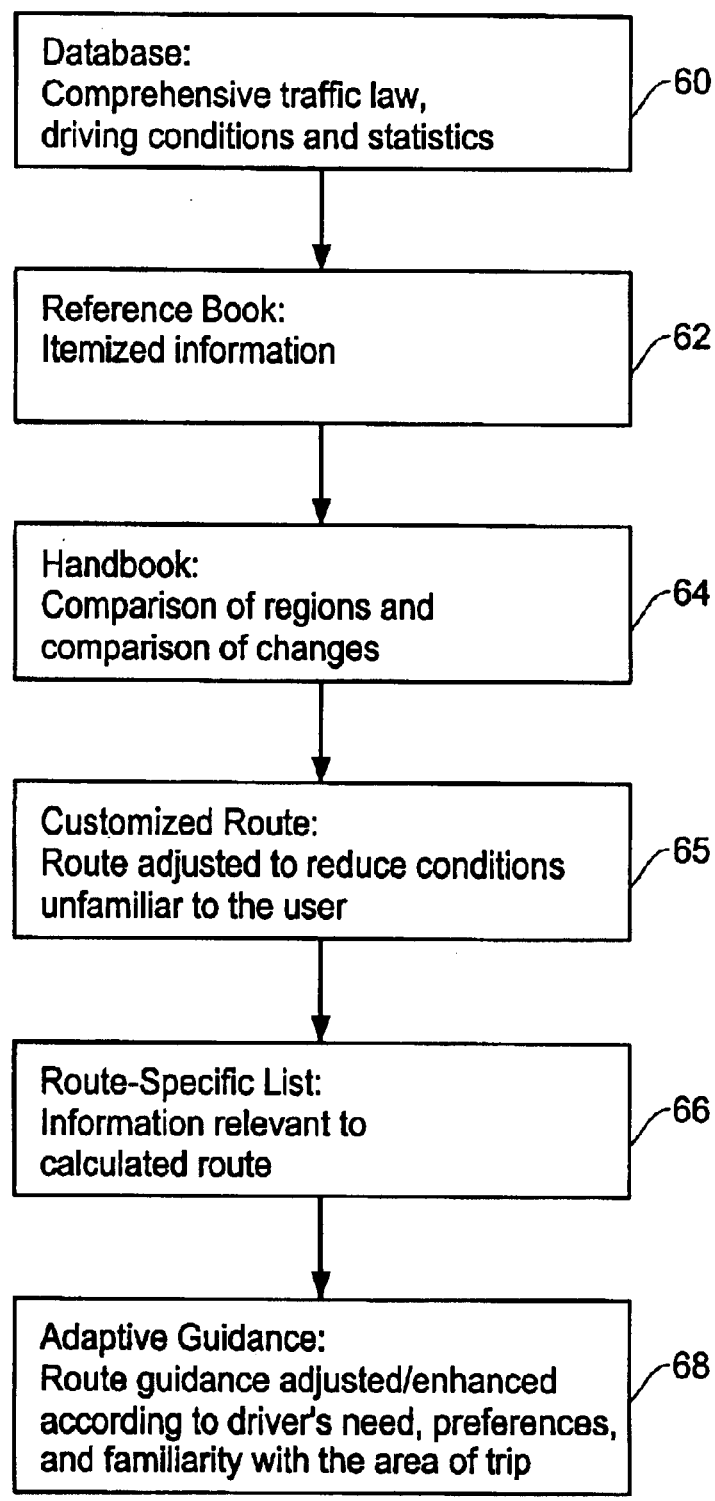
FIG. 5 is a diagram showing an example of layers of information sources and the relationship therebetween for extractions and representations of area-specific information in the present invention.

The procedure by which the present invention extracts and displays the relevant information and associated display examples are explained with reference to FIGS. 5–12. FIG. 5 shows an example for extracting the relevant data in different levels. Namely, the functions for extracting the area-specific traffic information in this invention is structured in a hierarchical manner with several different levels depending on the particular needs of the user or the driving situation such as when a route is calculated or a particular location is reached, etc.

First, the comprehensive database 60 described above with reference to FIG. 4 has all the area-specific traffic information, such as traffic laws, traffic customs, driving conditions, weather conditions, traffic statistics of all countries, states, counties and cities within the mapped region, or portions thereof. The database 60 is indexed so that each item in the database can be searched and compared for extraction of relevant data. Based on the information in the database 60, the navigation system of the present invention provides different layers of data extraction and operation, i.e., reference book-level information 62, handbook-level information 64, customized route 65, route specific list 66, and adaptive guidance 68.

The reference book-level information 64 provides itemized data regarding traffic laws, traffic conditions, and the like, based on a search request by a user, such as a specific category, a state or city, year, etc. The handbook-level information 62 typically provides a result of data derived by comparing two or more items, such as between two states specified by a user. The customized route 65 is to produce a calculated route to the destination which avoids the driving conditions unfamiliar to the user. The route specific list 66 is obtained by extracting relevant data associated with a route to the destination calculated by the navigation system. The adaptive guidance 68 is activated at an appropriate time in response to the current vehicle position when such a position involves unique traffic information.

FIGS. 6A–6C are schematic diagrams showing display examples of extracting and browsing text-based information from the database layer 60 or reference book layer 62 of FIG. 5 according to the present invention. In the example of FIG. 6A, the navigation system provides a hierarchical menu-like construction where several layers of sub-menus are associated therewith. By selecting a desired item, such as "Arizona", the navigation system provides layers of sub-menus associated with the selected item "Arizona".

For example, the lowest layer of the menu is text-based information showing a list of features of traffic laws and regulations in a particular state (FIG. 6B) or a particular city (FIG. 6C). The user may browse the list of such information to know the unique traffic laws and regulations. Other than traffic laws, the navigation system also provides other area-specific traffic information including driving conditions, weather conditions, driving customs, and the like, of the selected area.

Figure 7:
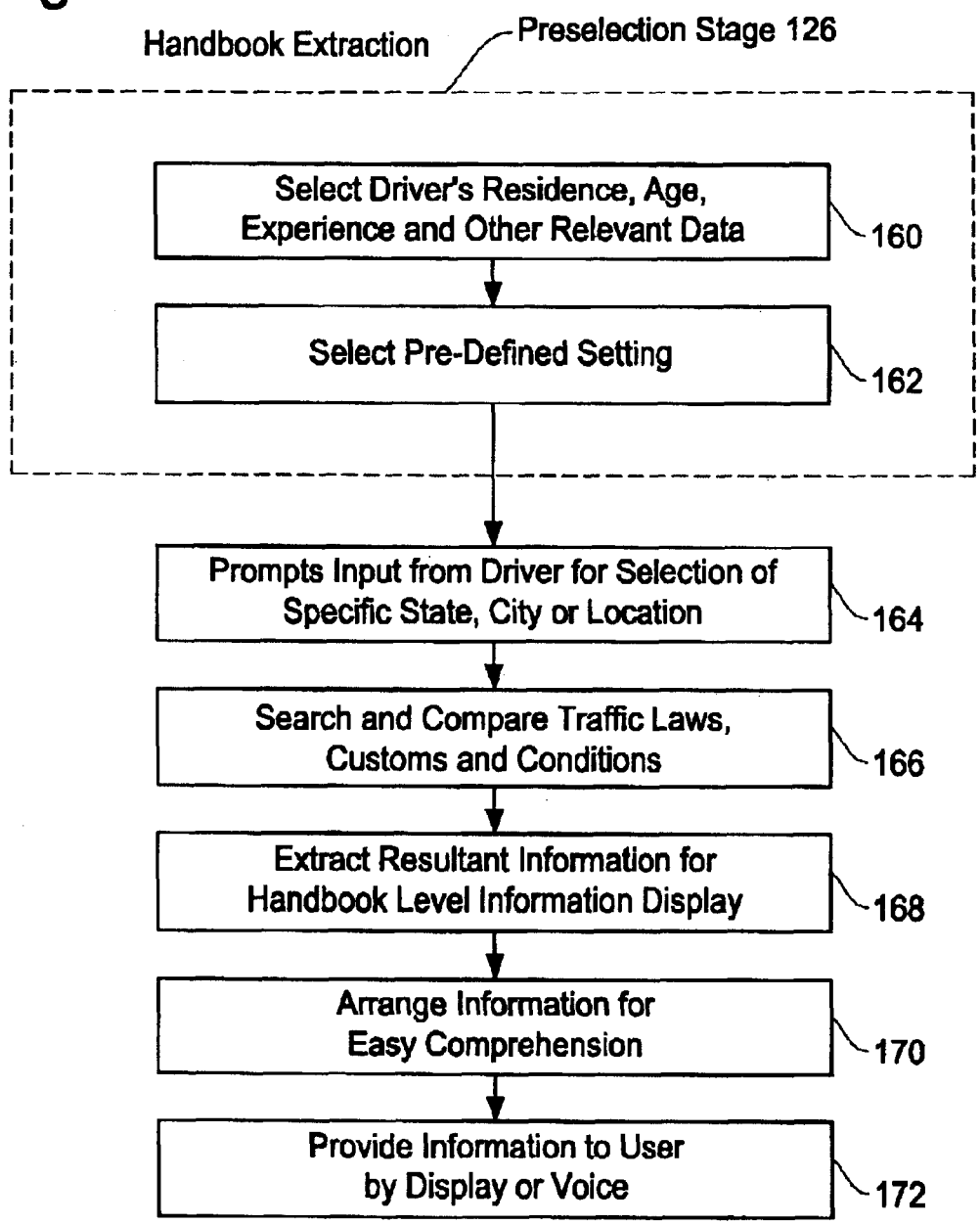
FIG. 7 is a flow chart showing an example of process for extracting and displaying the area-specific information in the handbook layer of FIG. 5 according to the present invention when the user requests information.

FIG. 7 is a flow chart showing an example of process for extracting and displaying the area-specific traffic information in the handbook layer 64 of FIG. 5 when the user requests the information, according to the present invention. FIGS. 8A–8C show display examples of the navigation system in the handbook layer operation. In this extraction procedure, the user specifies types of information to be compared and retrieved.

The procedure of FIG. 7 includes a pre-selection stage 126 having two steps 160 and 162. The pre-selection stage 126 helps the user to obtain relevant information specifically tailored for the user. The user's home city may be selected whenever the user uses the vehicle navigation system. Such information is preferably input at the first time the user uses the vehicle navigation system. Alternatively, such information may be predefined by a manufacturer or a dealer for user's convenience.

In the pre-selection stage 126, in step 160, the user inputs the information unique to the user such as a residence, age, driving experience, and other relevant data. In step 162, the user selects, from the data that has been input in the step 160, types of information desired to use in the handbook extraction process, such as user's age, or previously resided cities, and the like. In the case where the user wants to use all of the information particular to the user, the step 162 can be skipped.

Based on such information, the vehicle navigation system of the present invention can extract information that is more pertinent to the particular user. This selection can be performed each time a user activates the navigation system, or it may be input the first time the user uses the system so that the user need not repeatedly input such information. FIG. 8A is an example of a display for inputting the user's information necessary for determining relevant area-specific traffic information through a set-up menu of the navigation system.

In the display of FIG. 8A, the user selects the home state, age, and states where the user is familiar with the traffic laws and other traffic issues. The information inputted in this display is used for extracting relevant area-specific traffic information. In case where two or more users use the system, the vehicle navigation system of the present invention may save the settings for each user so that the user only need to select his/her own setting.

Figure 10:
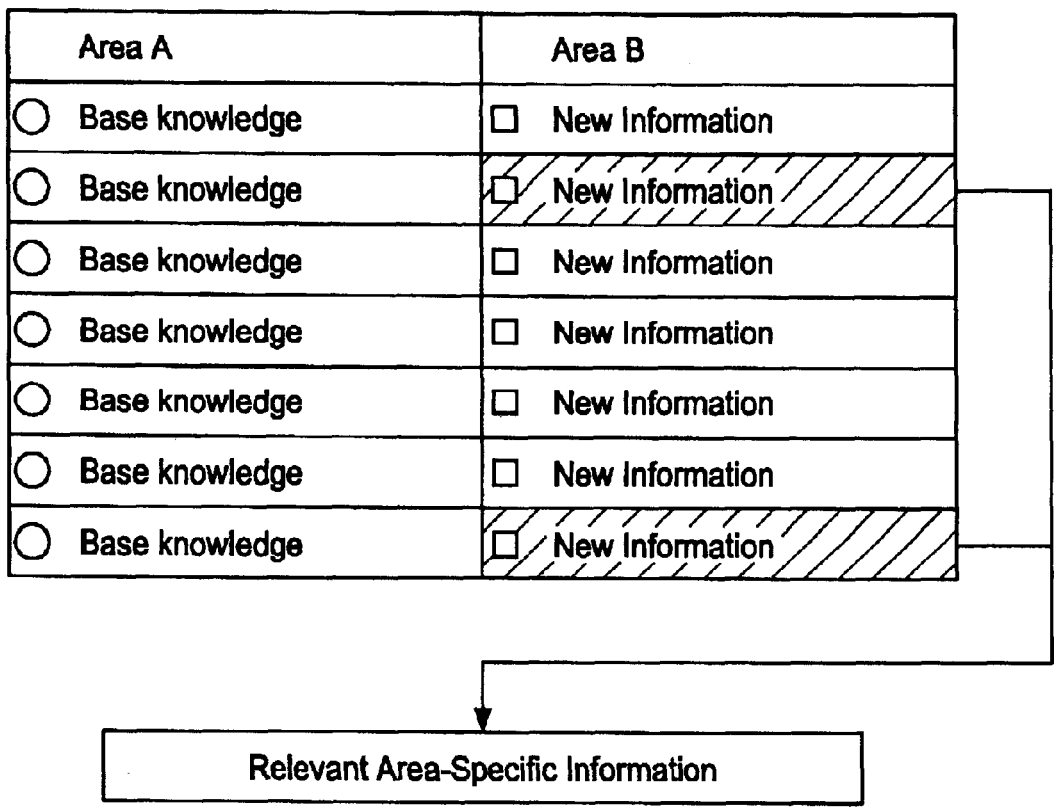
FIG. 10 is a diagram showing an example of process for extracting and displaying the area-specific information in any layer of FIG. 5 whenever necessary to inform the user of the area-specific information while driving.

At step 164 in FIG. 7, the navigation system prompts the user to input information necessary to find the relevant data. For example, the user may enter the destination state such as Arizona or Nevada. Supposing the user is a California resident, the user is presumed to be familiar with the area-specific traffic information of California. In this case, California is a home area of this particular user. The information that the user is assumed to be familiar with is referred to as the base knowledge. On the other hand, information that the user is assumed to be unfamiliar with is referred to as the new knowledge. Relevant area-specific traffic information is obtained by comparing the base knowledge and the new knowledge (FIG. 10).

FIG. 8B and FIG. 8C are examples of displays for inputting two areas to be compared to obtain handbook-level information. In FIG. 8B, two states are selected to extract the area-specific traffic information. In FIG. 8C, comparison is made between the home state or city of the user and other state. In this example, to fine-tune the extracted results, three categories are provided, i.e, "Traffic Laws", "Customs" and "Driving Conditions/Weather". In this example, the user selected "Traffic Laws" and "Driving Conditions/Weather", but did not select "Customs". In this particular setting, information pertinent to traffic laws and driving conditions and weather conditions, and the information comparing the selected categories between the two states will be extracted. As an alternative, the user can scroll the map and select an area to compare the traffic information of the selected area against that of the user's home area.

In step 166, the vehicle navigation system of the present invention searches the information on the selected state and selected categories and compares the information with that of the home city. The navigation system extracts the differences of the information between the two regions, at step 168, as resultant information. FIG. 10 illustrates this procedure in an abstract manner. Although described here, the procedure of FIG. 10 can be conducted at any stage of the operation of the navigation system where comparison between the two different areas has to be made. In FIG. 10, an area A is a home state or city where the user is familiar with the laws and customs (base knowledge). The user is not familiar with an area B (new information). Each corresponding item of the areas A and B is compared and the differences are extracted.

Thus, if the speed limit is 55 MPH (miles per hour) in the home area A and 55 MPH in the other area B, although the fact of 55 MPH speed limit in the area B is new to that user, the item is not extracted because the rules are identical. If the speed limit of the home area A is 55 MPH and that of the area B is 60 MPH, the item is extracted because the rules are different between the two. Accordingly, the vehicle navigation system of the present invention extracts the information that is different from that of the home area as the most relevant area-specific traffic information.

In step 170, the extracted information is arranged in such a way that it is easy for the user to understand. In the preferred embodiment, most important differences, such as recent changes, rules essential for safe driving, and other noteworthy issues are listed first. It should be noted that the differences may be arranged or ordered based on other criteria. Issues of similar types, importance levels, and detail levels may be grouped together. Different fonts or background colors may be used to distinguish group specific traffic issues. Confusing issues may be marked with a specific highlighting methods, such as a link to additional explanation or background information. Finally, at step 172, once the relevant area-specific traffic information is extracted and arranged, the information is either displayed on a monitor or provided by voice guidance.

The example described above is the case where a user is assumed to be familiar with specific traffic information of one area and information unfamiliar to the user is extracted by user's preference. However, it should be noted that it is possible to simply compare area-specific traffic information of two regions to find differences without regard to the user's familiarity with the information. Thus, unlike the examples described above, even when a user does not know the traffic laws in California and Arizona, the user can make the navigation system to simply compare traffic laws of both states, and obtain the differences of traffic laws.

Figure 9:
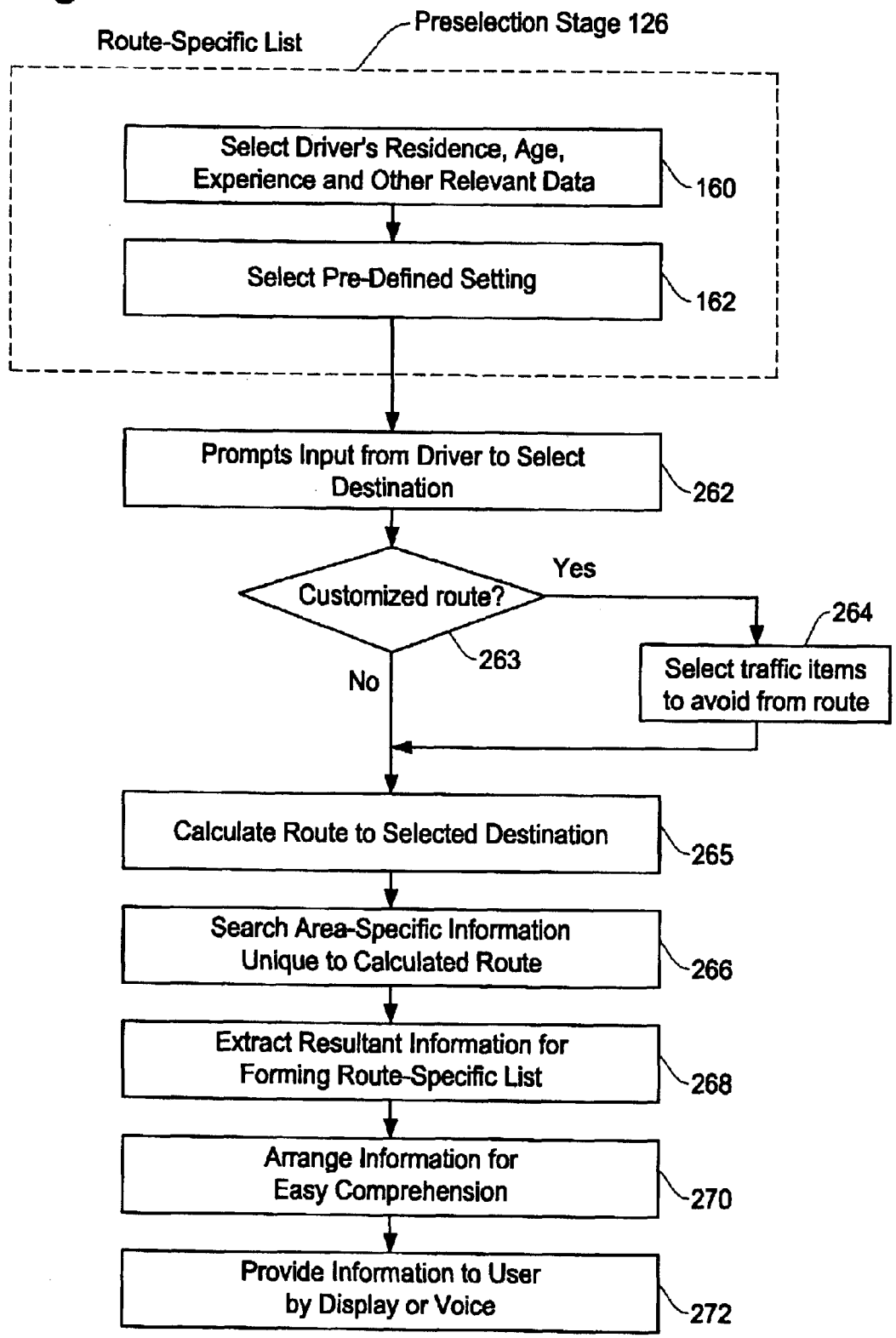
FIG. 9 is a flow chart showing an example of process for extracting and displaying the route specific information according to the present invention when the calculated route to the destination is determined.

FIG. 9 is a flow chart showing an example of process for producing the customized route 65 and/or extracting and displaying the route specific traffic information 66 of FIG. 5 in the present invention. In this procedure, the user inputs the destination so that the vehicle navigation system calculates the route to the destination. Once the route is calculated, the vehicle navigation system of the present invention searches and compares area-specific traffic information unique to the calculated route and expresses the information, for example as a list. During this process, if the user so desires, the navigation system adjusts the route calculation to avoid the unfamiliar traffic conditions.

In this procedure, rather than the handbook-level extraction of FIG. 7 which shows the difference between the two specified states in general, the navigation system provides a more specific set of traffic information pertinent to the calculated route. For example, the route specific traffic information includes a list of unique features and advice regarding traffic laws, as well as traffic conditions such as mountain roads, scarcity of gas stations, animal crossing, landslides area, etc, along the particular calculated route.

In the example of FIG. 9, the procedure includes the pre-selection stage 126 which is the same as that described above with reference to FIG. 7. In step 262, the navigation system prompts the user to select the destination so that the navigation system guides the user to the destination. In this step, the user can also input the information necessary to find and compare the relevant data as in the step 164 of FIG. 7.

Then, at step 264, the navigation system asks whether the user wants a "customized route" to the destination. As noted above, the customized route is a guided route to the destination in which the traffic conditions unfamiliar to the user are avoided. Further, even though the user is familiar with certain traffic conditions, the user can select such conditions to avoid in the guided route based on her preference and discretion.

Thus, in step 264, the user selects items of traffic condition that she wants to avoid in the calculated route. Such selection can be done based on the result of comparison in FIG. 10. Alternatively, the navigation can select the traffic conditions to be removed from the guided route based on the user's information. Thus, in step 265, the navigation system calculates various routes to the destination without including the traffic conditions selected as above and decides the most efficient route to the destination. If the user did not request the customized route in the step 263, the calculated route produced in the step 265 includes all of the traffic conditions unique to the route the destination.

Once the route to the destination is determined, the navigation system searches and collects the information unique to the calculated route in steps 266 and 268. If the calculated route involves mountain roads, the extracted information may include headlight requirements, snow chain requirements, and the like. If the calculated route involves an area that the user is assumed unfamiliar with (when the customized route was not requested in step 263), the differences of the area-specific traffic information between such an area and the user's home area are also collected.

In step 270, the extracted information is arranged in such a way that is easily and quickly understood by the user as described above. Accordingly, in step 272, the vehicle navigation system of the present invention provides, such as by the voice or display screen, the relevant area-specific traffic information that the user would encounter through the calculated route to the destination.

Typically, the function of extracting and displaying the route specific traffic information in the flow chart of FIG. 9 starts immediately after the calculated route to the destination is determined. Thus, the user is able to have prior knowledge about the traffic laws, traffic conditions, etc. that are unique to the calculated route at the start of travel to the destination. The user may keep or discard the extracted area-specific traffic information for later review.

Figure 11:
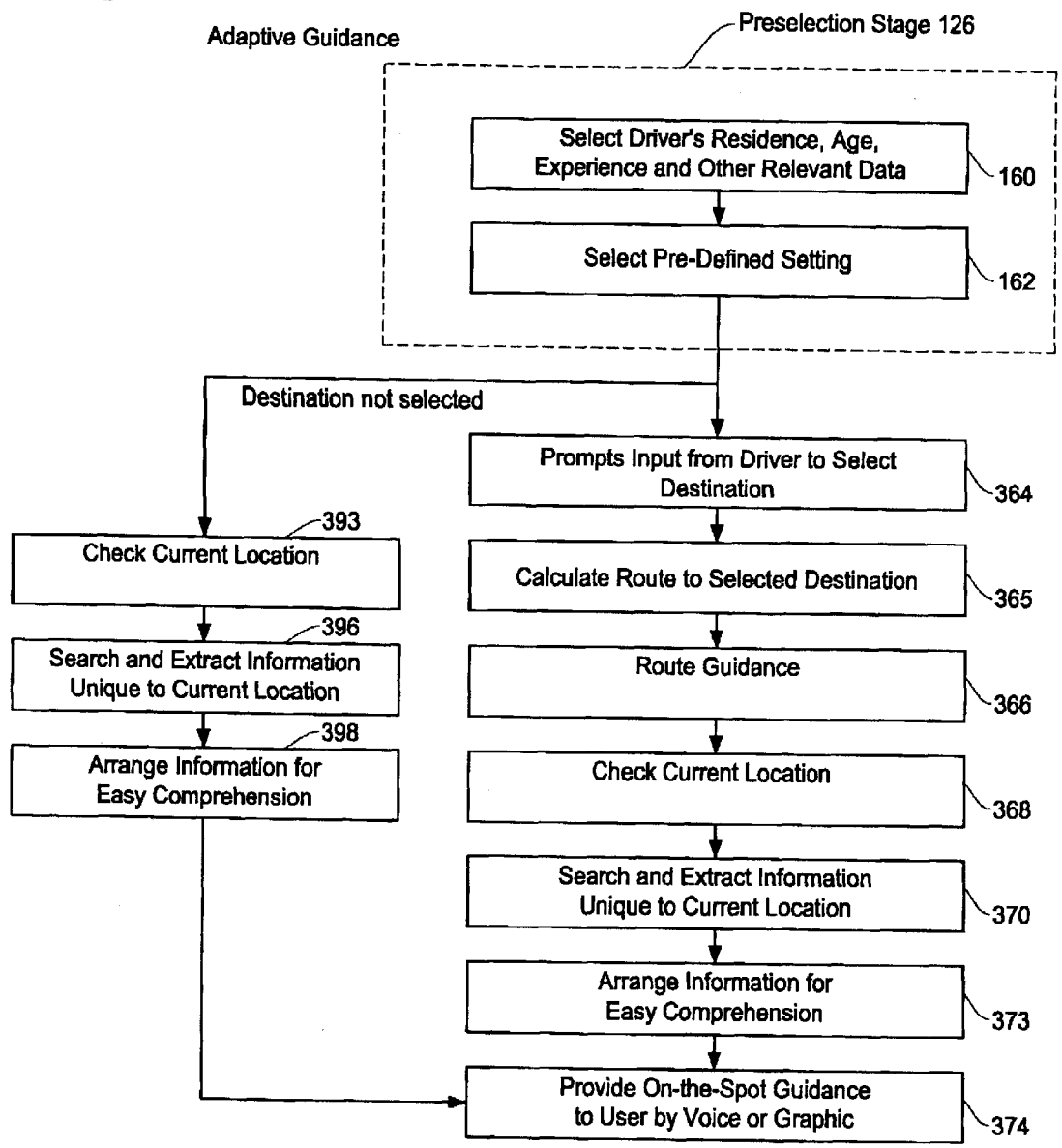
FIG. 11 is a flow chart showing an example of process for extracting and displaying the area-specific information in the adaptive guidance level of FIG. 5 according to the present invention.

FIG. 11 is a flow chart showing an example of process for extracting and displaying traffic related information based on the adaptive guidance 68 of FIG. 5 of the present invention. The adaptive guidance provides the user the traffic information specific to each location along the travel. The navigation system detects the current location of the vehicle and searches the traffic rules and other information unique to the location such as a special rule for turning a particular intersection or an advice not to confuse at a particular place.

Thus, in addition to the conventional route guidance, the adaptive guidance of the present invention provides the special information and advice when the vehicle approaches a location associated with specific traffic rules, traffic customs, road conditions, etc. When the vehicle approaches a place that needs user's attention, the navigation system indicates such specific traffic information through voice or graphic display.

In the example of FIG. 11, the procedure includes the pre-selection stage 126 which is the same as that described with reference to FIG. 7. The adaptive guidance of the present invention does not always require that the navigation system is in the route guidance mode. As long as the navigation system is able to detect the current location of the vehicle, the navigation system collects and announces the information unique to the location. Therefore, the flow chart of FIG. 11 has two paths, one with the route guidance and the other without the route guidance.

In the path involving the route guidance, in step 364, the navigation system prompts the user to select the destination. In this step, the user can also input the information regarding two regions to compare the traffic-related information between the two regions as described with reference to FIGS. 7 and 8. Then, at step 365, the navigation system calculates various routes to the destination and decides the most efficient route to the destination. Accordingly, at step 366, the navigation system is moved to the route guidance mode to guide the user to the destination through the calculated route.

During the travel to the destination, the navigation system detects the current location of the vehicle and searches and collects the information unique to the current location in steps 368 and 370. The navigation system arranges the extracted information in such a way that is easily comprehensible by the user in step 373. Then, in step 374, the navigation system expresses such information by preferably both voice and graphic display.

The adaptive guidance can be activated even when the destination is not defined in the navigation system. The flow chart of FIG. 11 shows this procedure at the left side by steps 393, 396 and 398. The navigation system detects the current location of the vehicle in step 393, and searches and collects the information unique to the current location in step 396. Here, the current location may include areas around the vehicle as well as the upcoming streets and intersections ahead of the vehicle. The navigation system arranges the extracted information to effectively show the information to the user without distracting the driving in step 398. The arranged information is graphically displayed and announced by voice in the step 374.

Figure 12A:
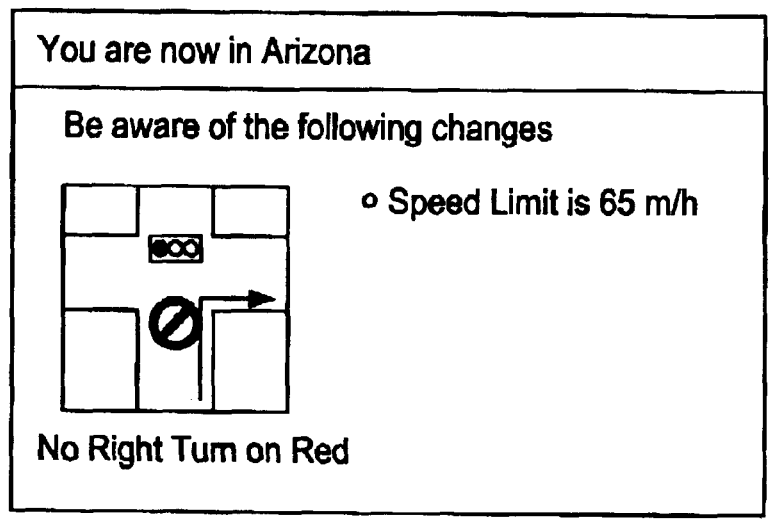
FIGS. 12A and 12B are diagrams showing an example of display for informing the user of unique features or differences in the local traffic laws or other traffic information by graphic images in the adaptive guidance.
Figure 12B:
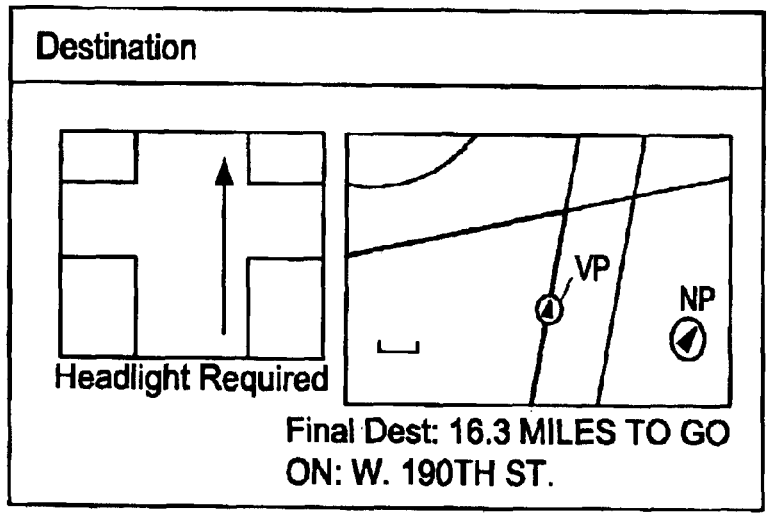

As described above, the adaptive guidance functions when the user is following the calculated route in the route guidance mode of the navigation system or when the user is driving the vehicle without using the route guidance mode. Examples of providing the area-specific traffic information based on the adaptive guidance is shown in FIGS. 12A and 12B. In these display examples, the navigation system shows in a graphic fashion (and also by voice), the unique traffic rules or situations of particular locations. In FIG. 12A, the navigation system indicates that the particular intersection prohibits the right turn when the signal is red. In FIG. 12B, the navigation system indicates that the particular street requires the headlights.

As has been described above, according to the present invention, the navigation method and system informs the user of area-specific traffic information such as local traffic laws, driving conditions, local customs, weather/climate, etc. in an efficient manner by extracting relevant information tailored for the user and comparing known information and unknown information. When the destination is specified and the calculated route to the destination is determined, the navigation method and system informs the user about traffic laws, driving conditions, customs, etc. unique to the calculated route. Further, while driving, the navigation method and system collects and informs the user about traffic laws, driving conditions, customs, etc. unique to the current user position.

Although the invention is described herein with reference to the preferred embodiment, one skilled in the art will readily appreciate that various modifications and variations may be made without departing from the spirit and scope of the present invention. Such modifications and variations are considered to be within the purview and scope of the appended claims and their equivalents.

What is claimed is:

1. A navigation method for providing area-specific traffic information to a user of a navigation system, comprising the following steps of:

forming a map database storing traffic information in a navigation system for extraction of the traffic information with respect to each area;

entering instructions in the navigation system to find traffic information specific to an area or destination specified by the user;

searching and collecting traffic information from the database specific to the area or destination specified by the user; and informing the user of the collected traffic information specific to the area by the navigation system.

2. A navigation method as defined in claim 1, wherein said traffic information in said database includes at least one of traffic laws and regulations, traffic conditions, traffic customs and weather conditions for each area and is coded and indexed in such a manner as to allow item by item extraction of the traffic information.

3. A navigation method as defined in claim 1, wherein said step of entering the instructions in the navigation system includes a step for specifying two areas so that the navigation system extracts and compares the traffic information between the two areas thereby producing information showing differences therebetween.

4. A navigation method as defined in claim 3, wherein one of said two areas is a home area of the user and another is a non-home area which is unfamiliar to the user, and wherein said step of comparing the traffic information between the two areas includes a step of producing traffic information of only the non-home area that is different from that of the home area.

5. A navigation method as defined in claim 1, wherein said step of entering the instructions in the navigation system includes a step of specifying destination of travel in the navigation system so that the navigation system calculates and determines a calculated route to guide the user to the destination, and said step of searching and collecting the traffic information includes a step of collecting traffic information unique to the calculated route.

6. A navigation method as defined in claim 5, wherein said step of collecting traffic information unique to the calculated route includes a step of listing the collected traffic information after the calculated route is determined.

7. A navigation method as defined in claim 1, wherein said step of entering the instructions in the navigation system includes a step of specifying destination of travel in the navigation system so that the navigation system calculates and determines a calculated route to guide the user to the destination and a step of selecting traffic information so as to produce a calculated route customized to the user in such a way to avoid traffic conditions associated with the selected traffic information in the calculated route.

8. A navigation method as defined in claim 1, wherein said step of searching and collecting the traffic information includes a step of detecting a current location of the user and collecting traffic information unique to the current location.

9. A navigation method as defined in claim 1, wherein said step of searching and collecting the traffic information includes a step of collecting traffic information unique to an attribute of the user where said attribute includes age and home city of the user.

10. A navigation method as defined in claim 1, further comprising a step of arranging the collected traffic information in a manner easily comprehensible to the user by incorporating highlight, colors, different font sizes and types, background patterns, or icons.

11. A navigation method as defined in claim 10, wherein said step of arranging the collected traffic information includes a step of listing the traffic information by placing a high priority to important differences from that of the areas familiar to the user and recent changes in traffic laws.

12. A navigation system for providing area-specific traffic information to a user, comprising:

means for forming a map database storing traffic information in a navigation system for extraction of the traffic information with respect to each area;

means for entering instructions in the navigation system to find traffic information specific to an area or destination specified by the user;

means for searching and collecting traffic information from the database specific to the area or destination specified by the user; and means for informing the user of the collected traffic information specific to the area by the navigation system.

13. A navigation system as defined in claim 12, wherein said traffic information in said database includes at least one of traffic laws and regulations, traffic conditions, traffic customs and weather conditions for each area and is coded and indexed in such a manner as to allow item by item extraction of the traffic information.

14. A navigation system as defined in claim 12, wherein said means for entering the instructions in the navigation system includes means for specifying two areas so that the navigation system extracts and compares the traffic information between the two areas thereby producing information showing differences therebetween.

15. A navigation system as defined in claim 14, wherein one of said two areas is a home area of the user and another is a non-home area which is unfamiliar to the user, and wherein said means for comparing the traffic information between the two areas includes means for producing traffic information of only the non-home area that is different from that of the home area.

16. A navigation system as defined in claim 12, wherein said means for entering the instructions in the navigation system includes means for specifying destination of travel in the navigation system so that the navigation system calculates and determines a calculated route to guide the user to the destination, and said means for searching and collecting the traffic information includes means for collecting traffic information unique to the calculated route.

17. A navigation system as defined in claim 16, wherein said means for collecting traffic information unique to the calculated route includes means for listing the collected traffic information after the calculated route is determined.

18. A navigation system as defined in claim 12, wherein said means for entering the instructions in the navigation system includes means for specifying destination of travel in the navigation system so that the navigation system calculates and determines a calculated route to guide the user to the destination and means for selecting traffic information so as to produce a calculated route customized to the user in such a way to avoid traffic conditions associated with the selected traffic information in the calculated route.

19. A navigation system as defined in claim 12, wherein said means for searching and collecting the traffic information includes means for detecting a current location of the user and collecting traffic information unique to the current location.

20. A navigation system as defined in claim 12, wherein said means for searching and collecting the traffic information includes means for collecting traffic information unique to an attribute of the user where said attribute includes age and home city of the user.

21. A navigation method as defined in claim 12, further comprising means for arranging the collected traffic information in a manner easily comprehensible to the user by incorporating highlight, colors, different font sizes and types, background patterns, or icons.

22. A navigation system as defined in claim 21, wherein said means for arranging the collected traffic information includes means for listing the traffic information by placing a high priority to important differences from that of the areas familiar to the user and recent changes in traffic laws.

* * * * *